United States Patent [19]
Kyricos

[11] Patent Number: 5,445,876
[45] Date of Patent: Aug. 29, 1995

[54] VAPOR EXCHANGE MEDIUM

[76] Inventor: Christopher J. Kyricos, 8 Short St., Cohasset, Mass. 02025

[21] Appl. No.: 69,282

[22] Filed: May 28, 1993

[51] Int. Cl.$^6$ ............................................... B32B 5/16
[52] U.S. Cl. .................................... 428/283; 428/228; 428/289; 502/70
[58] Field of Search ............ 428/283, 288, 289, 307.3; 55/387, 389, 522, 524, 527; 502/64, 70

[56] References Cited

U.S. PATENT DOCUMENTS

| | | | |
|---|---|---|---|
| 4,391,667 | 7/1983 | Vangbo et al. | 156/205 |
| 4,595,403 | 6/1986 | Sago et al. | 55/389 |
| 4,875,520 | 10/1989 | Steele et al. | 165/10 |
| 5,052,188 | 10/1991 | Komarneni et al. | 62/94 |

OTHER PUBLICATIONS

Hackh's Chemical Dictionary, 3rd ed., McGraw-Hill, p. 213 (1944).

*Primary Examiner*—Christopher W. Raimund
*Attorney, Agent, or Firm*—Cesari and McKenna

[57] ABSTRACT

A vapor exchange medium comprises a multiplicity of porous desiccant particles and a binder holding the particles together to form a solid shape. The binder includes a multiplicity of substantially spherical, covalently-bonded silica particles derived from a silica sol which are small enough to ensure sufficient covalent bonding of the silica particles to maintain the structural integrity of the vapor exchange medium, yet large enough relative to the pore size of the desiccant particles such that the silica particles do not materially adversely affect the adsorption properties of the desiccant particles. The vapor exchange medium has an isotherm separation factor of 0.07 to 0.1 The vapor exchange medium may be impregnated into a fibrous carrier to form a heat exchange element or device. Apparatus for making the a exchange device is also disclosed.

19 Claims, 3 Drawing Sheets

VAPOR EXCHANGE MEDIUM

FIELD OF THE INVENTION

This invention relates to a vapor exchange medium and to a method and apparatus for making such a medium. It relates especially to a vapor exchange medium which can be configured into desirable solid shapes to form adsorbing/desorbing elements, heat exchange wheels and the other similar devices.

BACKGROUND OF THE INVENTION

A vapor exchange medium is basically a desiccant or molecular sieve that may be used to remove water vapor from the ambient air. For example, desiccants such a silica gel and alumina gel, in powder form, are commonly used to minimize the moisture content of the air in containers housing objects that could be damaged by such moisture. The powder particles contain minute pores which enable the particles to adsorb water vapor present in the air inside the package. If the desiccant is then removed from the package and regenerated by placing it in a dry atmosphere, e.g., a heated oven, the particles will release or desorb the water vapor into that environment.

On a much larger scale, a desiccant may be incorporated into the heat exchange wheel of a heat exchanger so that apparatus functions as a heat/moisture exchanger. A typical such wheel comprises web material carrying a desiccant and spirally wound into a roll or wheel, with the adjacent convolutions of the rolled web being spaced apart, e.g., by web corrugations, so that air can travel axially along the wheel. The wheel may be rotatably mounted coaxially in a duct which is divided in half lengthwise by a partition so that the wheel intercepts both halves of the duct. If hot, humid air is moving along one half of the duct, say, into an air conditioned building, and cooler, dryer air being exhausted from the building is traveling through the other half of the duct, rotation of the wheel will transfer heat and moisture from the incoming air to the outgoing air. In other words, at any given time, the sector of the wheel that intercepts the half of the duct carrying the incoming air will absorb heat and adsorb water vapor from that air. When that sector of the wheel rotates opposite the half of the duct passing the outgoing air, the wheel portion will give up heat and moisture to that cooler, dryer air. Thus, as the wheel rotates, the desiccant in progressive sectors of the wheel is first adsorbing and then desorbing water vapor. Conventional vapor exchange media and heat exchange wheels formed thereby are described, for example, in U.S. Pat. Nos. 4,391,667; 4,595,403; 4,875,520 and 5,052,188. For simplicity, we will hereinafter refer to such heat/moisture wheels simply as heat exchange wheels or devices.

While prior desiccants function satisfactorily in powder form, when combined when a binder to form a solid structure, they do not display the moisture adsorbing capabilities that would be expected from the amount of desiccant present. In some cases, the desiccant may have a high adsorption affinity for the binder material, be it an organic binder such as latex, or an inorganic binder such as water glass or solutions of water soluble glasses. Resultantly, the binder reduces the capacity of the desiccant particles for water vapor adsorption. Also, some binders contact the desiccant particles over relatively large surface areas thereby occluding the particles pores which degrades the performance the desiccant.

Further, such vapor exchange media that use organic binders are disadvantaged too because they cannot be used in some regenerative heat exchangers because the heat of regeneration, which may be as high as 450° F., can cause those organic materials to break down.

Those heat exchange devices that incorporate corrugated heat exchange elements suffer because the desiccant is added to the heat exchange elements after the corrugations are formed in those elements. This may reduce the amount of desiccant that can be incorporated into the finished product and also places constraints on the desiccant application equipment which then has to accommodate the unwieldy shape of the corrugated web.

Other prior heat exchange devices and wheels are disadvantaged because they require to many process steps in their manufacture and are thus too cost intensive.

Accordingly, it is an object of the present invention to provide an improved vapor exchange medium which can be configured easily into a solid shape.

Another object of the invention is to provide a medium of this type which is able to withstand the relatively high temperatures commonly used to regenerate the medium.

A further object of the invention is to provide a vapor exchange medium of this generally type which can be incorporated into a heat exchange element.

Yet another object of the invention is to provide a heat exchange device, e.g., a heat exchange wheel, utilizing such a medium.

Yet another object is to provide a vapor exchange medium with a variably modifiable corrugation geometry.

Another important object of the invention is to provide a heat exchange element having an optimal isotherm separation factor of about 0.07 to 0.1.

A further object of the invention is to provide a method of making a vapor exchange medium and a heat exchange element incorporating such a medium.

Still another object of the invention is to provide a method of making a heat exchange device having one or more of the above advantages.

Still another object of the invention is to provide apparatus for making the aforementioned heat exchange device.

Other objects will, in part, be obvious and will, in part, appear hereinafter.

The invention accordingly comprises the several steps and the relation of one or more of such steps with respect to each of the others, the apparatus embodying the features of construction, combination of elements and arrangement of parts which are adapted to effect such steps and the article which possesses the characteristics, properties and relation of elements, all as exemplified in the detailed disclosure set forth hereinafter, and the scope of the invention will be indicated in the claims.

SUMMARY OF THE INVENTION

In its simplest form, my vapor exchange medium comprises a multiplicity of porous desiccant particles, e.g., alumina silicate (zeolite) and a binder for holding the particles together to form a solid shape. In accordance with the invention, the binder includes a multiplicity of substantially spherical, covalently bonded silica particles gelated from a silica sol. The spherical shape of the silica binder particles provides the most efficient geometry to minimize surface area contact between the silica particles and the desiccant particles, thereby maximizing the number of desiccant pores that are available for adsorption. The silica particles are selected to be of a size which is small enough to ensure sufficient covalent bonding of the particles to maintain the structural integrity of the vapor exchange medium, yet large enough relative to the pore size of the desiccant so that the particles do not adversely effect the adsorption properties of the desiccant. Silica spheroids in the range of 50 to 500 nanometers, 7 to 22 Å being optimum, satisfy these requirements in conjunction with zeolite particles of 5 microns average diameter 5 micron and having an average pore size of 6 to 10 Å, with 7-8 Å being optimum.

While a solid silica spheroid-bonded vapor exchange medium is functional by itself, e.g., as a drying agent in packaging, for most applications the desiccant is applied to a substrate or impregnated into a carrier. In the application of particular interest here, the desiccant is impregnated into a non-woven web comprising a heat exchange element that may be used to form a heat exchange device, namely a heat exchange wheel. The processing steps of the method of preparing the heat exchange wheel will be explained in detail below. Suffice it to say at this point that the silica and desiccant particles are mixed to form a silica sol desiccant slurry. The slurry is then applied to a pre-defined or self supporting fibrous carrier mat prior to subjecting the mat to pressure and heat to compress the mat to its final caliper and to further bond together the mat fibers to form the finished heat exchange element. The same heat and pressure causes gelation of the silica sol and interbonding of the silicon particles which thereupon encage the desiccant particles in the interstices of the carrier. Thus, bonding occurs in the vapor exchange medium and in the heat exchange element carrier at essentially the same time and at tile same step in the process. If the heat exchange element is to be corrugated or otherwise shaped, that may be done at the same time. This procedure allows accurate control over tile binder concentration in the finished product and over the ratio of active (molecular sieve) to the non-active (carrier) components of the finished product.

As will be seen later, my method of making a corrugated heat exchange element or wheel also facilitates changing the corrugation geometry and arrangement in the finished product to accommodate changes in the operating requirements of the associated heat exchanger.

BRIEF DESCRIPTION OF THE DRAWINGS

For a fuller understanding of the nature and objects of tile invention, reference should be had to tile following detailed description, taken in connection with the accompanying drawings, in which.

DETAILED DESCRIPTION OF ILLUSTRATIVE EMBODIMENTS

Figure 1:
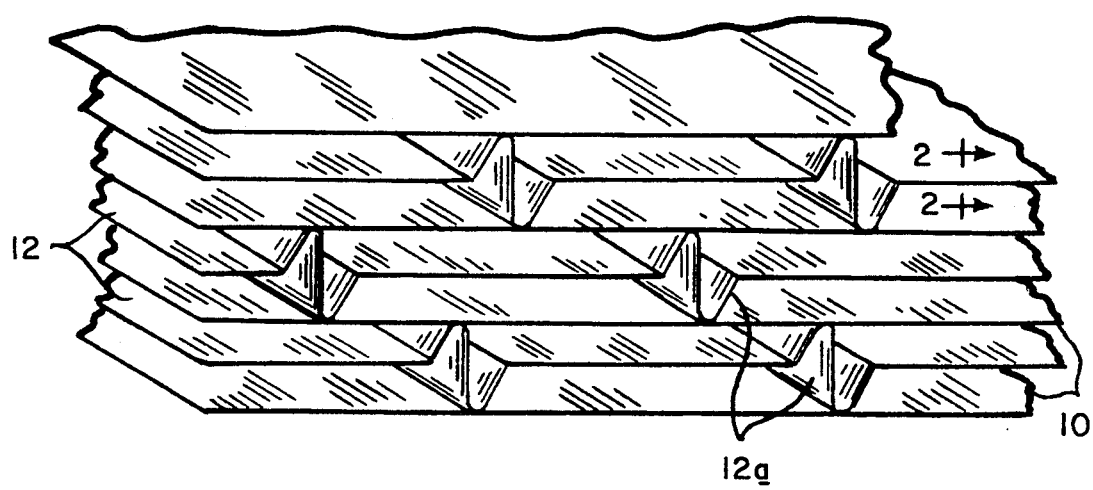
FIG. 1 is a fragmentary side elevational view of a heat exchange device made in accordance with this invention.

Referring now to FIG. 1 of the drawings, a heat exchange device incorporating my vapor exchange medium comprises flat web layers 10 and corrugated web layers 12 which are interleaved to form a multilayer structure, with adjacent layers being maintained in spaced-apart relation for the most part by corrugations 12a in layers 12. The layers 10 and 12 may be held together by bonding corrugations 12a to layers 10 or by straps or other similar means (not shown). FIG. 1 may be seen as a partial end view of a sector of a heat exchange wheel formed by winding a pair of superimposed flat and corrugated webs into a roll as will be described hereinafter in connection with FIG. 3.

Figure 2:
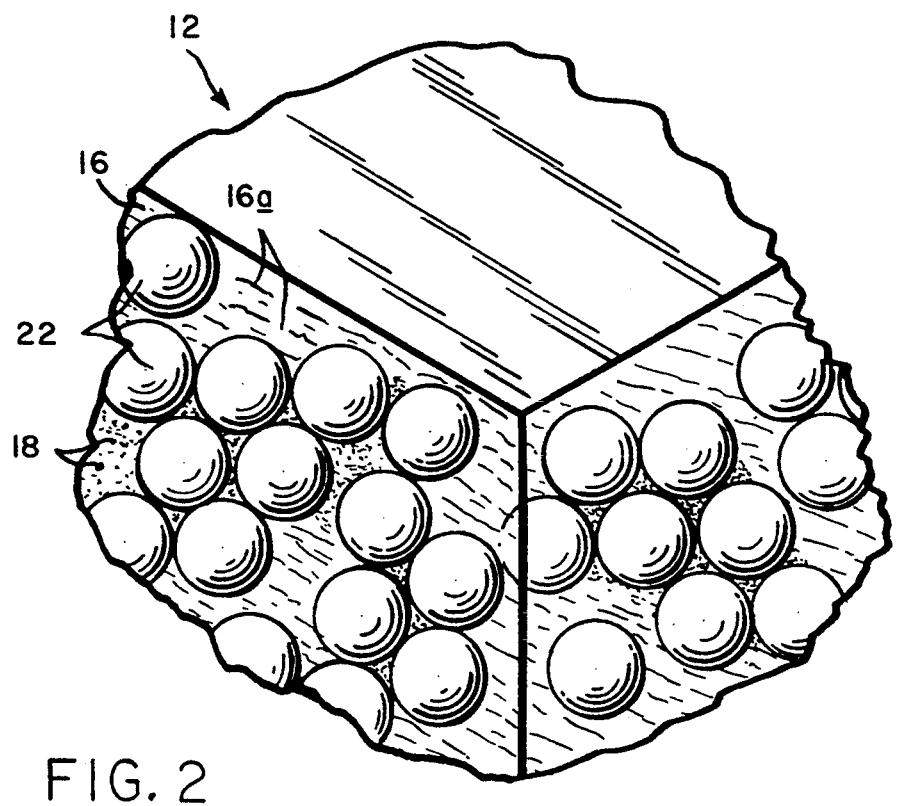
FIG. 2 is a fragmentary sectional view, on a greatly enlarged scale, taken along line 2—2 of FIG. 1, showing a heat exchange element of the FIG. 1 device.

Each layer 12 constitutes a vapor exchange medium and a heat exchange element. As seen in FIG. 2, each element 12 consists of a fibrous carrier 16 composed of fibers 16a and impregnated with desiccant particles 18 that are encaged within the interstices of the carrier by bonded-together silica particles 22, all of the particles filling the spaces between the carrier fibers 16a.

The Carrier 16

In applications where the heat exchange element will be subjected to elevated temperatures, e.g., during regenerative heating, the carrier should consist of an inorganic material, e.g., glass fibers, may be a heat-resistant organic material such as aromatic polyamide fibers (e.g., the product marketed by E.I. duPont de Nemours and Co., Wilmington, Del. under the name "KEVLAR") or the equivalent.

The Desiccant Particles 18

The preferred desiccant is a modified alumina silicate (zeolite) powder ($SiO_2$—$Al_2O_3$) having an $SiO_2$—$Al_2O_3$ ratio on an atomic basis of 6.0–9.0 to 1, a ratio of 3.2–4.5 to 1 being the optimum, with reduced polarity on the internal surfaces of the pores of its tetrahedral cage. The mean pore size of the zeolite particles should be 6 to 10 Å, 7-8 Å being the optimum diameter.

Such modified zeolite desiccant particles and their manufacture are known from U.S. Pat. No. 5,052,188, the contents of which is hereby incorporated herein by reference. This desiccant has a low heat of adsorption, a high water adsorption capacity, a high diffusivity of water, high chemical and physical stability towards heat and can impart a separation factor ranging from 0.07 to 0.1 which is an ideal isotherm shape for gas fired cooling/dehumidifying applications, all as described in the aforesaid patent.

The Binder Particles 22

The spherical silica particles 22 which bind the desiccant particles 18 should have a mean diameter of 50 to 500 nanometers, with the optimum size ranging from 7 to 22 Å. Such spheroids are the primary particles precipitated from sodium silicate as is well known to those skilled in chemical process engineering. The silica spheroids are then dispersed in an alkaline medium, e.g., NaOH, which reacts with the surfaces of the silica spheroids to produce a negative charge so that the spheroids repel one another, resulting in a stable aqueous-based silica sol. As is well known, such a sol can be gelled by the removal of water, by changing the pH value of the sol, by adding a salt or a water miscible organic solvent such as methanol. In each case, gelation occurs as hydroxyl groups on the surface of the silica particles condense by eliminating water to form covalent siloxane bonds (Si—O—Si), resulting in coalescence and interbonding of the silica which leads ultimately to solidification of the silica mass.

In the present instance, zeolite particles and, perhaps, other desiccant particles are mixed with the silica sol in varying ratios called for by the particular application to form a slurry. When the silica sol gels, there results a network structure consisting of bonded-together spherical silica particles 22 which encage the desiccant particles and hold them within a unitary solid structure.

Because the size of the silica spheroids is selected to be within the above range, whereas the pores of the zeolite particles are, as stated above, much smaller, the critical pore size of the zeolite particles and the particles' inherent hygroscopic properties are not adversely effected to any appreciable extent by the silica binder. Yet, the silica spheres are small enough so that their cumulative surface area assures that there is sufficient covalent bonding between the silica particles to maintain the integrity of the gelled structure. It should also be emphasized that in the final product, because of their spherical shape, the silica particles 22 make minimal surface-to-surface contact with the desiccant particles 18. Resultantly, the particles 18 are more able to reach their full adsorption potential than is the case with desiccants bound into prior heat exchange elements that rely on other binder systems.

Other particulate material may be used instead of silica, so long as it falls within the proper size range and exhibits the necessary interaction upon evaporation of water to form a three-dimensional matrix or network.

Gelation, in the case of silica particles, is highly dependent on pH. Typically, gelation occurs as the sol reaches a critical pH level for a given dispersion concentration, with high pH levels operating to retard gelation. In many industrial operations, it is necessary to prevent excessively rapid gelation, requiring maintenance of high pH levels prior to deposition of the slurry onto the carrier. The skilled practitioner will appreciate and can readily determine the maximum allowable gelating rate for a given application, and the carrier material for use at such pH levels (with aromatic polyamide carriers, for example, exhibiting greater resistance to alkaline conditions than glass).

Illustrative Apparatus

Figure 3:
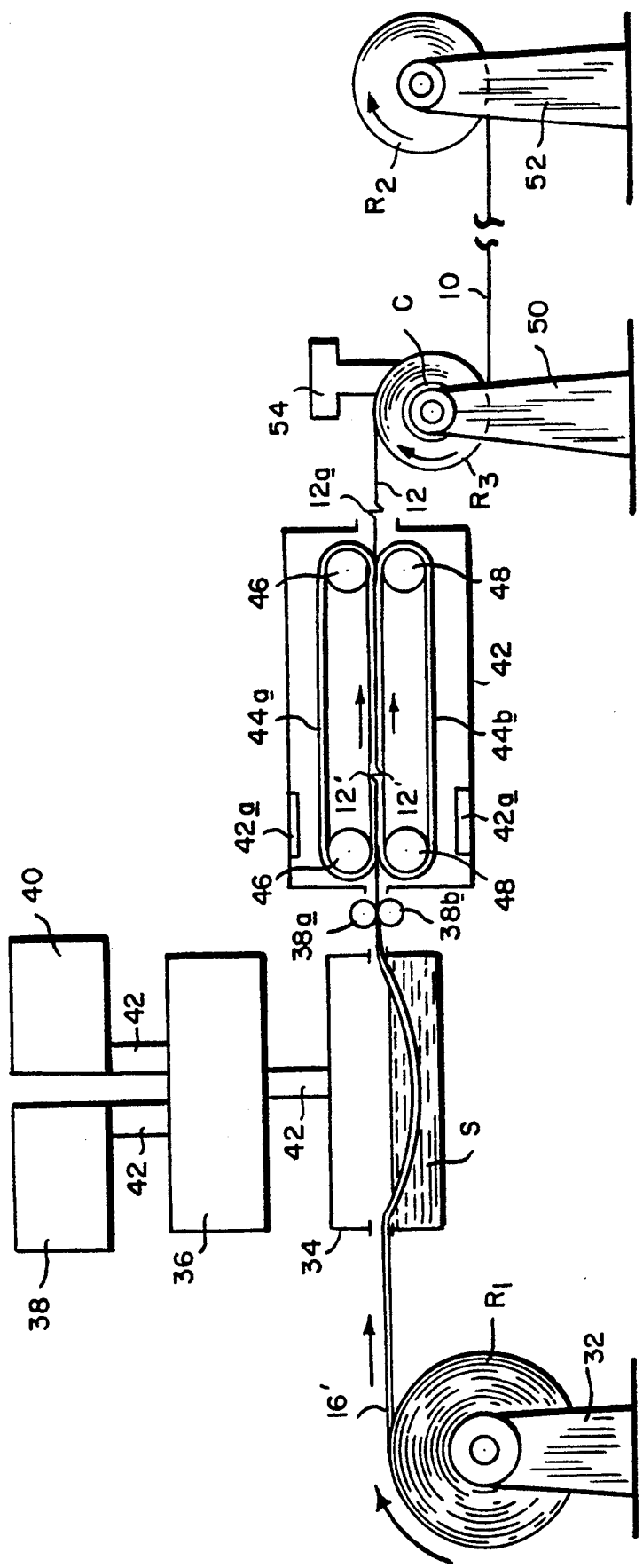
FIG. 3 is a diagrammatic view of apparatus for making the device depicted in FIG. 1.

As noted above, the silica sol-desiccant slurry can be gelled in situ to form a vapor exchange medium or it can be coated onto a substrate to form a heat/moisture exchange element. In the present application, the slurry is impregnated into the non-woven or fibrous carriers 16 of the web layers 12 (FIG. 1) before the corrugations 12a are formed in those layers. For this, a fibrous mat 16' e.g., of glass fibers, is prepared with the glass fibers being bound to one another by a suitable binder such as dilute amorphous sodium silicate, to an extent that the mat is at least pre-formed and self-supporting. Fibers which are in the order of 10 microns in diameter can be sufficiently bonded together in this manner for this purpose. The mat 16' is then wound into a roll $R_1$ which may be supported on a roll stand 32 as shown in FIG. 3. To impregnate the mat 16', the mat is conducted to a slurry saturation tank which receives slurry S, as needed, from a slurry holding tank 36. The tank 36, in turn, receives silica sol from a silica sol holding tank 38 and desiccant particles from a desiccant holding tank 40. Pipes 42 connecting the various tanks include flow metering valves (not shown) to control the desiccant-/sol ratio of the slurry in tank 34.

As the mat 16' passes through tank 34, it is saturated with the slurry whose constituents completely fill the spaces between the mat fibers 16a. During this time, the ratio of active, i.e., desiccant particles 18, to inactive, i.e., carrier fibers 16a, can be controlled by controlling the amount of desiccant in the slurry and the residence time of the mat 16' in tank 34.

From tank 34, the mat 16' is conducted between a pair of rollers 38a and 38b which compress the mat to some extent to establish an initial uniform mat caliper and to remove excess slurry from the mat. The mat then enters a heater/corrugator unit 42. In unit 42, the mat passes between a pair of endless belts 44a and 44b, the upper belt being stretched between a pair of rollers 46, 46 and the lower belt extending between a pair of rollers 48, 48. The two belts 44a and 44b are spaced apart by a distance corresponding to the final caliper desired for the web layers 12 in FIG. 1, e.g. 0.005 inch. The belts 44a and 44b may be driven in the direction shown by the arrows by any suitable means (not shown).

Figure 4:
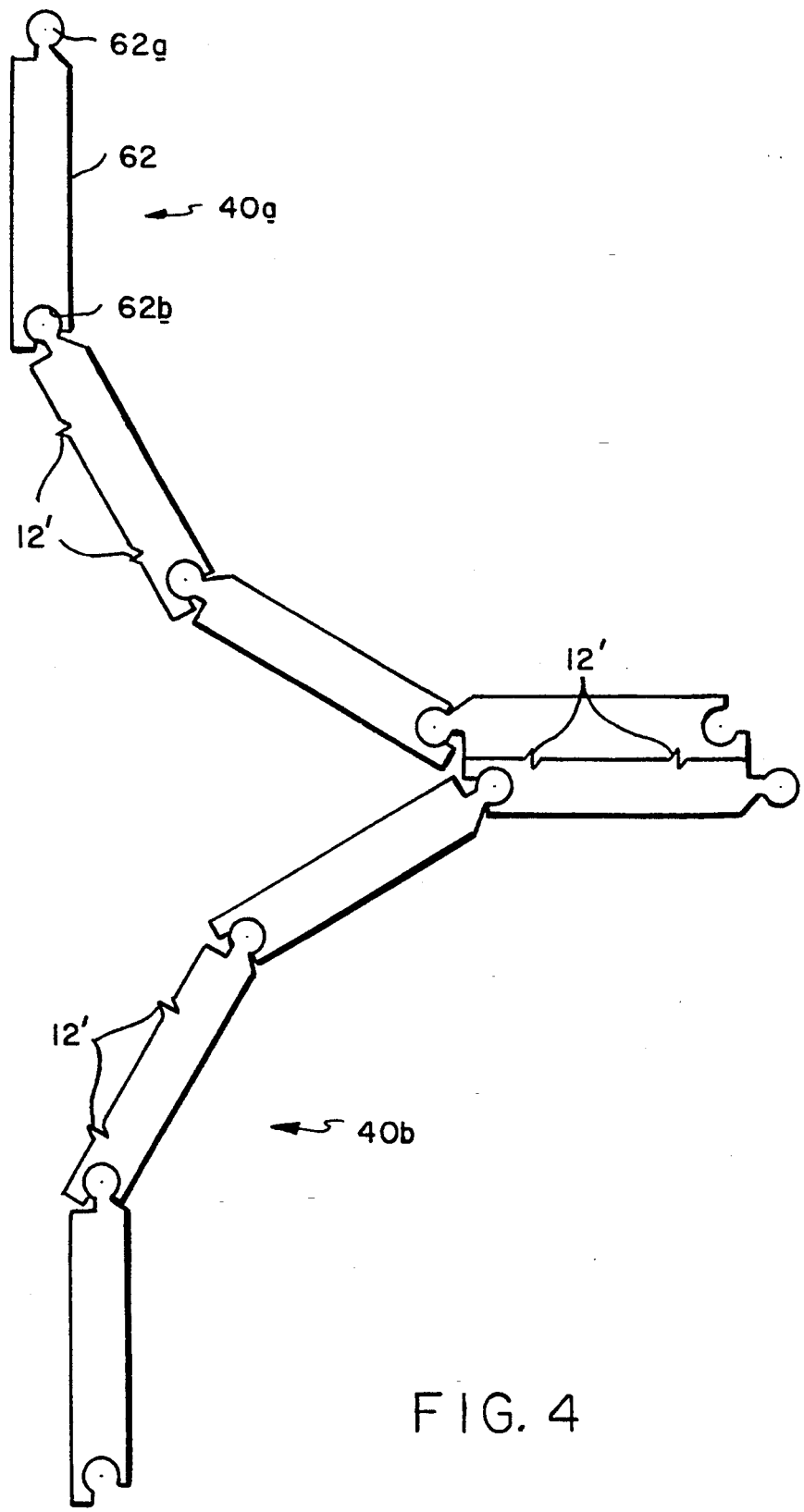
FIG. 4 is a fragmentary side elevational view, on a larger scale, showing parts of the FIG. 3 apparatus in greater detail.

If the heat exchange elements are to be corrugated, the belts 44a and 44b include opposed laterally extending mating corrugations along their lengths as indicated at 12' in FIG. 3 and as depicted in detail in FIG. 4. These corrugations 12' may be spaced along the belts as shown or be contiguous in which case, the resulting layers 12 will be rippled like standard corrugated paper board.

Unit 42 also contains one or more heaters 42a. Heaters 42a heat mat 16' as it enters the unit to a temperature sufficient to enable the bonding together of the filiments 16a comprising the mat, e.g., 370° F. Thus, as the mat 16' travels through unit 42 between the belts 44a and 44b, it is compressed and heated to form the finished corrugated carrier 16.

At the same time, the water is removed from the sol componont of the mat impregnant resulting in the interbonding of the silica particles 22 which thereupon encage and hold together the desiccant particles 18 within the carrier. The bonding together of the silica particles also reinforces the bonds between the substrate fibers 16a, thereby greatly strengthening the substrate and rendering it more resistant to air/gas flow through the substrate, thereby minimizing cross-leakage through a heat exchange wheel formed by web layers 12.

If the web layers 12 are to be part of a heat exchange wheel, the web may be wound up on a role core C supported by a roll stand 50, along with web 10 drawn from a roll R2 supported by a roll stand 52. When the core C is rotated in the direction of the arrow by a web winder 54, the web layers 10 and 12 will wind up on core C so as to form a heat exchange wheel $R_3$, a section of which is shown in greater detail in FIG. 1.

In the apparatus illustrated in FIG. 3, it should be understood that the web layer 10 derives from a mat similar to mat 16' that is processed in the same way as mat 16' except that it is not corrugated. Therefore, web layer 10 has the same vapor exchange characteristics as layer 12.

It should be appreciated from the foregoing that since the corrugations 12a of web layer 12 are formed at essentially the last step of the manufacturing process, it is relatively easy to change the shape and arrangement of those corrugations without materially effecting the adsorbing/desorbing properties of layer 12. Furthermore, since the web layer 12 is fully impregnated with desiccant before the corrugations are formed and before the layers are wound into a heat exchange wheel, this greatly simplifies the construction of the wheel.

Refer now to FIG. 4 which illustrates in greater detail the belts 44a and 44b in the heater/corrugator unit 42 that facilitate geometric changes to, or rearrangements of, the corrugations 12a of the heat exchange layer 12. As shown in FIG. 4, each belt 44a, 44b comprises an endless train of links 62, each link having a male end 62a which swingably interfits with a female end 62b of an adjacent link. The faces of the links of the two belts which oppose one another when the belts are rotated are flat except that certain of those mating faces may be provided with mating corrugations 12' which form the corrugations 12a in the web layer 12. Thus, the shapes of the corrugations 12a and their placements along the web layer can be changed simply by substituting different links 62 or rearrangeing the corrugated links along the belts 44a and 44b. Resultantly, it is very easy to change the configuration of the layer 12 from a standard rippled shape or arrangement to a different one to suit a particular application or set of variables involving axial gas flow, laminar flow requirements, thermal efficiency, enthalpy, etc.

In some cases, it may be desirable to provide a coating on the exposed edges only of the web layers 10 and 12 to protect the edges abrasion. This may be accomplished by coating the edges with a solution consisting of sodium silicate and 10% by weight magnesium oxide, 10% by weight titanium dioxide and 2.5% by weight of a non-ionic surfacant using, for example, a rolling paint applicator.

It will thus be seen that the objects set forth above among those made apparent from the preceeding description are efficiently attained and, since certain changes may be made in carrying out the above process, in the described product and in the construction set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention described herein.

I claim:

1. A vapor exchange medium comprising
a multiplicity of porous dessicant particles, and
binder means holding said dessicant particles together to form a solid shape, said binder means comprising a multiplicity of substantially spherical, covalently bonded silica particles derived from a silica sol
wherein said silica particles are small enough to ensure sufficient covalent bonding of the silica particles to maintain the structural integrity of the vapor exchange medium, yet large enough relative to the pore size of the dessicant particles such that the silica particles do not adversely affect the adsorption properties of the dessicant particles and
wherein the vapor exchange medium has an isotherm separation factor of 0.07 to 0.1.

2. The medium defined in claim 1 wherein the desiccant particles include zeolite particles having a mean pore size of 6 to 10 Å.

3. The medium defined in claim 2 wherein the zeolite particles are de-aluminized with an SiO2 to Al2O3 ratio on an atomic basis of 3.2-4.5 to 1.

4. The medium defined in claim 3 wherein the zeolite particles have a mean pore size of 7-8 Å.

5. The medium defined in claim 1 and further including means for supporting said shape.

6. The medium defined in claim 5 wherein
said shape supporting means is a fibrous carrier, and said shape fills the interstices of said carrier.

7. The medium defined in claim 6 wherein said carrer comprises glass fibers.

8. The medium defined in claim 6 wherein said carrier comprises aromatic polyamide fibers.

9. A vapor exchange medium comprising
support means;
a multiplicity of porous dessicant particles, and
binder means holding said particles together and to said support means to form a solid body, said binder means comprising a multiplicity of substantially spherical, covalently bonded silica particles 50 to 500 Å in diameter derived from a silica sol
wherein said silica particles are small enough to ensure sufficient covalent bonding of the silica particles to maintain the structural integrity of the vapor exchange medium, yet large enough relative to the pore size of the dessicant particles such that the silica particles do not adversely affect the adsorption properties of the dessicant particles and
wherein the vapor exchange medium has an isotherm separation factor of 0.07 to 0.1.

10. The medium defined in claim 9 wherein the desiccant particles include zeolite particles.

11. The medium defined in claim 10 wherein the desiccant particles include silica or alumina gel particles.

12. The medium defined in claim 10 wherein the zeolite particles have a mean pore diameter of 6 to 10 Å.

13. The medium defined in claim 12 wherein the zeolite particles have a mean pore size of 7-8 Å.

14. The medium defined in claim 10 wherein the zeolite particles are de-aluminized with an SiOhd 2 to Al2O3 ratio on an atomic basis of 3.2-4.5 to 1.

15. The medium defined in claim 9 wherein said support means is a fibrous carrier, and
said desiccant particles and said binder means are impregnated into said carrier.

16. The medium defined in claim 15 wherein said carrier comprises glass fibers.

17. The medium defined in claim 15 wherein said carrier comprises aromatic polyamide fibers.

18. A vapor exchange element comprising
a fibrous carrier, and
a solid material impregnating said carrier,
said solid material comprising
a multiplicity of porous zeolite particles having an SiO2 to Al2O3 ratio on an atomic basis of 3.2:1 to 4.5:1 and a mean pore size of 7-8 Å, and
a binder consisting of covalently bonded, generally spherical silica particles 50 to 500 Å in diameter derived from a silica sol and encaging said dessicant particles in the spaces between the carrier fibers
wherein said silica particles are small enough to ensure sufficient covalent bonding of the silica particles to maintain the structural integrity of the vapor exchange element, yet large enough relative to the pore size of the dessicant particles such that the silica particles do not adversely affect the adsorption properties of the dessicant particles and
wherein the vapor exchange element has an isotherm separation factor of 0.07 to 0.1.

19. The medium defined in claim 18 wherein said carrier comprises glass fibers or aromatic polyamide fibers.

* * * * *

UNITED STATES PATENT AND TRADEMARK OFFICE
CERTIFICATE OF CORRECTION

PATENT NO. : 5,445,876
DATED : August 29, 1995
INVENTOR(S) : Christopher J. Kyricos It is certified that error appears in the above-identified patent and that said Letters Patent is hereby corrected as shown below:

Col. 3, line 13, "Å" should be —nanometers—;

Col. 4, line 57 "nanometers" should be —Å—;

Col. 4, line 58, "Å" should be —nanometers—;

Col. 8, line 36, "SiOhd" should be $SiO_2$

Signed and Sealed this

Thirtieth Day of January, 1996

Attest:

BRUCE LEHMAN

Attesting Officer

Commissioner of Patents and Trademarks